Sept. 9, 1941. J. E. TRESCHER 2,255,725
KNOCK-OUT WINDOW SETTING FOR BUSSES AND THE LIKE
Filed July 11, 1940
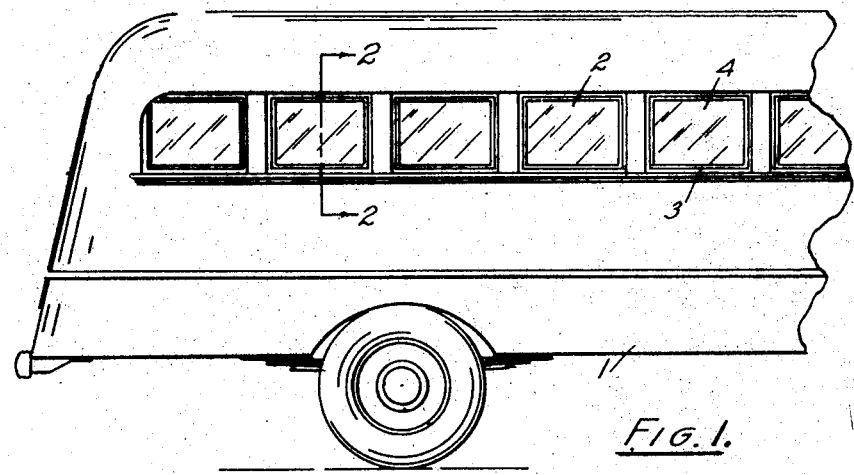
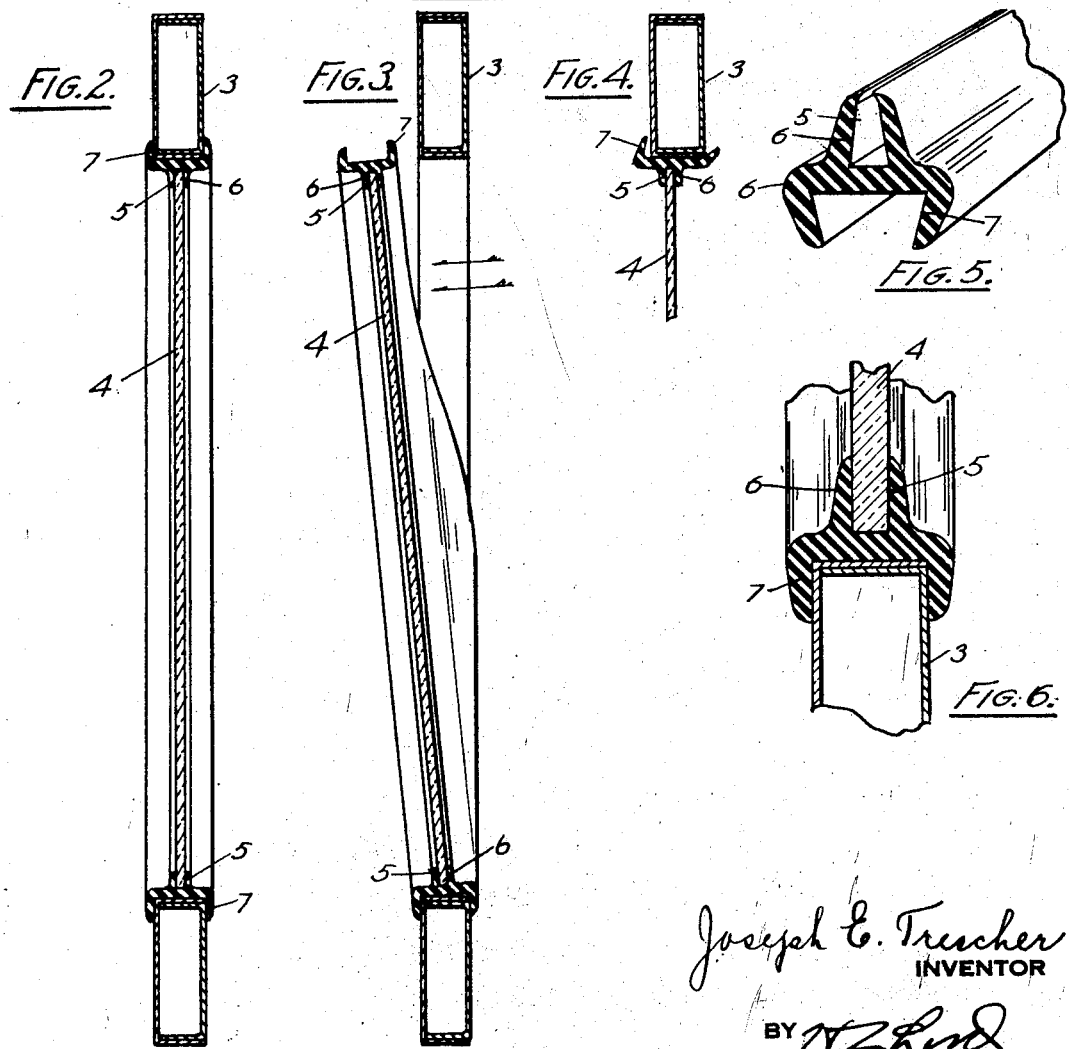
Joseph E. Trescher
INVENTOR
BY
ATTORNEYS Patented Sept. 9, 1941

2,255,725

UNITED STATES PATENT OFFICE 2,255,725

KNOCK-OUT WINDOW SETTING FOR BUSSES AND THE LIKE

Joseph Edward Trescher, Guilford College, N. C., assignor to Continental Rubber Works, Erie, Pa., a corporation of Pennsylvania Application July 11, 1940, Serial No. 344,866

3 Claims. (Cl. 296—44)

Busses and similar vehicles having windows as ordinarily supplied present a hazard in that if the bus is turned over or wrecked, it is very difficult, in some instances, for the occupants, even though uninjured, to get out of the bus.

The present invention is designed to correct this difficulty by providing window settings for the panes in the window of a character that will permit of the whole pane being pushed out under pressure on the pane, ordinarily without breaking the window and at the same time be sufficiently secure to hold the window in position under all normal conditions.

As an example of its utility, it has been used with relation to school busses, and in such busses, in case of accident the windows may be knocked out leaving a smooth edge around the opening through which the children may be removed. Features and details of the invention will appear from the specification and claims.

A preferred embodiment of the invention is illustrated in the accompanying drawing as follows:

Fig. 1 shows a side elevation of a portion of a bus.

Fig. 2 a section on the line 2—2 in Fig. 1.

Fig. 3 a similar section with the pane partially knocked out of the frame.

Fig. 4 shows the pane in the initial position as it is knocked out.

Fig. 5 an enlarged perspective view of the channel strip in which the window pane is mounted.

Fig. 6 an enlarged section of the window pane and channel strip holding the pane.

1 marks a bus of ordinary construction, 2 window openings in the bus, 3 window frames which are usually formed of metal, and 4 a pane of transparent material such as glass which is mounted in the frame.

The pane is surrounded by a channel strip 6. It is seated in a channel 5 which includes the entire periphery of the pane. A channel strip 7 receives the edge of the surrounding frame 3. Preferably these channel strips have the flanges slightly inturned, as this gives a more definite sealing effect on the frame and pane.

The channel flanges are such that upon a thrust on the window pane, the flange on the side from which the thrust is applied yields, as shown in Figs. 3 and 4, permitting the pane and its mounting to be removed from the frame. Thus an opening is provided through which the bus may be emptied of its occupants. The openings being free from any jagged or cutting edges makes this operation a comparatively simple one. Under any normal conditions the glass or pane is held securely in position.

What I claim as new is:

1. The combination with a vehicle window having a frame and a pane mounted therein of transparent material such as glass; of a strip of resilient material such as rubber surrounding the pane, said strip having a channel receiving the pane and a channel receiving the surrounding frame, the channel receiving the frame being more yielding than the channel receiving the pane, said strip yieldingly holding the pane in place but yielding to permit the bodily removal of the pane through yielding of the strip under abnormal thrust on the pane.

2. The combination with a vehicle window having a frame and a pane mounted therein of transparent material such as glass; of a strip of resilient material such as rubber surrounding the pane, said strip having a channel receiving the pane and a channel receiving the surrounding frame, the flanges of said channels being inturned, the channel receiving the frame being more yielding than the channel receiving the pane, said strip yieldingly holding the pane in place but yielding to permit the bodily removal of the pane through yielding of the strip under abnormal thrust on the pane.

3. The combination with a window having a frame and a pane mounted therein of transparent material such as glass; of a strip of resilient material such as rubber surrounding the pane, said strip having a channel receiving the pane and a channel receiving the surrounding frame, said frame being thicker than the pane and the channel receiving the frame being wider than the channel receiving the pane making the flanges of the wider channel more yielding.

JOSEPH EDWARD TRESCHER.